Patented Oct. 15, 1929

1,732,088

UNITED STATES PATENT OFFICE

JULIUS HOCHHUT, OF KLEIN-FREDEN, GERMANY

MANUFACTURING GLASS-MELTING CRUCIBLES AND SIMILAR REFRACTORY OBJECTS OF CLAY

No Drawing. Application filed December 22, 1927, Serial No. 241,999, and in Germany November 6, 1925.

This invention relates to the manufacture of glass melting crucibles and similar refractory objects of clay.

Three processes are generally known in the ceramic industry for shaping masses. These processes may be distinguished by the percentage of water in the mass. In the casting process the mass has the highest percentage of water to obtain the necessary fluidity thereof. The masses, which are shaped in the usual way, that is, by turning, freely shaping, or moulding them in open moulds, possess an average percentage of water, while masses having a much smaller percentage of water are shaped by "dry pressing" and punching. In this latter process it was necessary to employ closed moulds and high pressures in order to obtain the necessary coherence of the shaped body in spite of the low plasticity of the mass.

The bodies made by dry pressing and punching have, in comparison with the bodies made of a more moist mass, the great advantage of drying and becoming kiln-ripe much sooner, without suffering from the drawbacks of the more moist bodies which, when dried quickly, have the tendency to shrink, crack and warp. This mode of manufacture however has been limited to comparatively small bodies, as the use of closed moulds requires very high pressures, and as the necessary closed moulds for large bodies are too costly, and, principally, as large bodies of a sufficiently uniform texture cannot be manufactured in this manner.

Now tests have proved, that a clay mass, which in the ordinary sense of the term is unplastic due to its low percentage of water, becomes so plastic by constantly stamping it under high pressure, that large objects can be manufactured thereof in open moulds, by gradually supplying the mass to the mould and stamping it therein under high pressure so as to obtain a dense and solid body. This new shaping process may be called "open mould pressing".

It is to be understood, that my invention does not reside exclusively in the employment of a stamping operation. On the contrary, it resides in the fact, that masses having an extraordinarily low percentage of water are stamped in thin layers into open moulds. The masses worked in this manner are so slightly plastic, that they are in a loose gritty condition when placed into the mould.

The stamping operation itself has already been employed in shaping ceramic masses. For instance, the retorts used in the lighting gas industry are stamped into wooden moulds fitted with a core, and even in the manufacture of glass melting crucibles this method has been employed. But the masses used for this method possess such a high percentage of water and consequently are so highly plastic, that they can be worked even by spreading them into moulds. The masses possess a high coherence and are placed into the moulds in the form of lumps and clods. The same holds good for the stamping of oven liners and covers. Furthermore, the stamped mass of this kind scarcely needs to have any strength, as it is burnt, so to speak within the mould or, at least in the place where it is shaped. Fundamental differences exist therefore between my new method and the method hitherto employed.

With limy masses used in the manufacture of artificial stones, it has already been proposed to stamp the mass previously drained by pressing. This case, however, has nothing to do with ceramic manufacture, as it is concerned with masses that do not contain clay. It is sufficient to supply a mass of this nature to the mould in a state of low density. The necessary strength is obtained later on by the lime setting.

In realizing the object of my method, the melting crucible or pot to be manufactured must possess such a uniform texture, that it is capable of resisting the strains which are encountered during the drying process, the transporting of the dried piece and the tempering process. The principal strains to be withstood are those caused by chemical attacks and variations in temperature, when the pieces are enameled and finished. My crucibles, pots and the like, consisting of a stamped loose gritty and moderately moist mass, surprisingly possess all of these required properties.

My method may be carried out, for example, in the following manner:

The constituents of the mixture, that is, the leaning means of suitable grain size and the fresh clays in air dry or wholly dry and suitably ground state, are combined in correct proportions and the required amount of water is added and mixed therewith as uniformly as possible. In order to obtain the most uniform possible distribution of the water in the clay and to eliminate the formation of lumps, the leaning means is advantageously moistened with the quantity of water required, for the whole mixture before the clay is added. It is still more advantageous to add first to the water small quantities of the fresh clay. The leaning means moistened with this mixture is then intimately mixed with the main quantity of clay. No matter how this mixing operation may be performed, a loose incoherent gritty mass is obtained in every case. This mass is placed in small portions into the mould and stamped therein under high pressure, preferably by means of pneumatic stampers. When so treated, there is the suprising phenomenon of the mass acquiring a slight plasticity, which apparently results from the inner excitation caused by the blows. This plasticity is sufficient to so unite the portions of the mass supplied to the mould that under the action of the powerful blows they form a uniform solid mass. The mould to which the loose mass mixed in the described manner is supplied, may be made of gypsum, wood, iron or any other suitable material and is filled by gradually adding and constantly stamping the mass. Immediately after having been filled, the mould itself may be withdrawn, as the moulded pieces now possess sufficient strength and can be transported immediately into the drying chambers.

When more complicated shapes are to be produced, a small quantity of oil is advantageously mixed into the mass, to facilitate the removal of the mould, as is usual in the known punching method.

The following is a practical example of the mixture:

To a mixture of 300 kilograms of burnt and disintegrated clay and 215 kilograms of disintegrated refractory crucible shivers, 40 to 45 liters of water are added. This leaning means completely absorbs the indicated quantity of water. Now 425 kilograms of air-dry ground glass melting pot clay are gradually added to the mixture as the latter is being constantly agitated. After having been uniformly mixed, the mass is placed into the mould in the described manner with constant stamping.

The mass of the composition indicated contains, as tests have proved, 8.8 per cent of water, while the same mass used in the known spreading method contains 16.5 per cent of water.

Glass melting crucibles manufactured by my method have all the valuable properties found in ceramic products manufactured by dry-pressing and punching. They are produced so to speak, already in the so-called leather-hard state.

Whereas, in known processes, extraordinarily long drying periods, frequently of some months, and quite careful warming processes were required, the pieces formed in my described manner may be subjected to any desired accelerated drying process, so that they are ready for the kiln within a fraction of the time hitherto required. As to the burning process and the use of my product in the glass kiln, there is the very important advantage that such a dense body is obtained by my described treatment, that the shrinkage caused by the fire is less and the resistibility and life of the crucibles are considerably increased.

What I claim, is:—

1. The process of manufacturing glass melting crucibles and similar refractory articles of clay, consisting in mixing clay with a ground leaning means, moistening the mixture with water only to an extent so as to obtain a loose incoherent mass, supplying said mass in small portions to an open mould while permanently stamping it therein, and drying and burning the shape thus obtained.

2. The process of manufacturing glass melting crucibles and similar refractory articles of clay, consisting in preparing a suitable quantity of dry ground clay, preparing a leaning means, moistening it with a quantity of water required for the whole mixture, mixing the moistened leaning means with said clay, supplying the whole mass in small portions to an open mould while permanently stamping it, and drying and burning the shape thus obtained.

3. The process of manufacturing glass melting crucibles and similar refractory articles of clay, consisting in preparing a suitable quantity of dry ground clay, preparing a leaning means, adding a slight quantity of said clay to a quantity of water required for the whole mixture, moistening the leaning means with this water and mixing it with the main quantity of said dry ground clay, supplying the whole mass in small portions to an open mould while permanently stamping it, and drying and burning the shape thus obtained.

4. The process of manufacturing glass melting crucibles and similar refractory articles of clay, consisting in mixing 400 kg. burnt and disintegrated clay with 215 kg. disintegrated refractory crucible shivers, adding to this mixture 40 to 45 l. of water, adding 425 kg. of air-dry ground refractory clay while agitating the mass, supplying the whole mass in small portions to an open mould while permanently stamping it, and drying and burning the shape thus obtained.

In testimony whereof the foregoing specification is signed.

DR. JULIUS HOCHHUT.

CERTIFICATE OF CORRECTION.

Patent No. 1,732,088.     Granted October 15, 1929, to

JULIUS HOCHHUT.

It is hereby certified that error appears in the printed specification of the above numbered patent requiring correction as follows: Page 2, line 103, claim 1, after the word "to" insert the word "such" and strike out the word "so"; line 104, strike out the word "obtain" and insert "produce"; line 106, strike out "permanently" and insert "constantly"; line 112, claim 2, strike out "it" and insert "the leaning means"; line 116, strike out "permanently" and insert "constantly"; line 124, claim 3, strike out "slight" and insert "small"; line 130, strike out "permanently" and insert "constantly"; page 3, line 12, claim 4, strike out "permanently" and insert "constantly"; and that the said Letters Patent should be read with these corrections therein that the same may conform to the record of the case in the Patent Office.

Signed and sealed this 3rd day of December, A. D. 1929.

(Seal)

M. J. Moore,
Acting Commissioner of Patents.

ing it, and drying and burning the shape thus obtained.

4. The process of manufacturing glass melting crucibles and similar refractory articles of clay, consisting in mixing 400 kg. burnt and disintegrated clay with 215 kg. disintegrated refractory crucible shivers, adding to this mixture 40 to 45 l. of water, adding 425 kg. of air-dry ground refractory clay while agitating the mass, supplying the whole mass in small portions to an open mould while permanently stamping it, and drying and burning the shape thus obtained.

In testimony whereof the foregoing specification is signed.

DR. JULIUS HOCHHUT.

CERTIFICATE OF CORRECTION.

Patent No. 1,732,088.  Granted October 15, 1929, to

JULIUS HOCHHUT.

It is hereby certified that error appears in the printed specification of the above numbered patent requiring correction as follows: Page 2, line 103, claim 1, after the word "to" insert the word "such" and strike out the word "so"; line 104, strike out the word "obtain" and insert "produce"; line 106, strike out "permanently" and insert "constantly"; line 112, claim 2, strike out "it" and insert "the leaning means"; line 116, strike out "permanently" and insert "constantly"; line 124, claim 3, strike out "slight" and insert "small"; line 130, strike out "permanently" and insert "constantly"; page 3, line 12, claim 4, strike out "permanently" and insert "constantly"; and that the said Letters Patent should be read with these corrections therein that the same may conform to the record of the case in the Patent Office.

Signed and sealed this 3rd day of December, A. D. 1929.

(Seal)

M. J. Moore,
Acting Commissioner of Patents.